US007048431B2

(12) United States Patent
Sieverding et al.

(10) Patent No.: US 7,048,431 B2
(45) Date of Patent: May 23, 2006

(54) PLASTIC PROCESSING MACHINE FOR PRODUCING FIBER-CONTAINING THERMOPLASTICS

(75) Inventors: Matthias Sieverding, München (DE); Jochen Zwiesele, München (DE); Rainer Zimmet, Neckarwestheim (DE); Roman Laberer, Oberroth (DE); Josef Sedlacek, Sent (CH); Rainer Wolf, Marburg (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 0 days.

(21) Appl. No.: 10/828,830

(22) Filed: Apr. 21, 2004

(65) Prior Publication Data

US 2004/0234639 A1 Nov. 25, 2004

Related U.S. Application Data

(63) Continuation of application No. PCT/EP02/11861, filed on Oct. 23, 2002.

(30) Foreign Application Priority Data

Oct. 23, 2001 (DE) ................................ 101 52 246

(51) Int. Cl.
*B29B 7/90* (2006.01)
(52) U.S. Cl. ...................................... 366/76.1; 366/141
(58) Field of Classification Search .... 366/76.1–76.93, 366/33, 18, 30, 141; 425/113–114; 242/421.3
See application file for complete search history.

(56) References Cited

U.S. PATENT DOCUMENTS

| 3,409,711 A | * | 11/1968 | Pashak et al. ............... 264/143 |
| 3,453,356 A | * | 7/1969 | Kent, Jr. et al. ............. 264/143 |
| 3,520,027 A | * | 7/1970 | Bird et al. ................. 425/131.1 |
| 3,583,679 A | * | 6/1971 | Godley, II ................... 366/76.6 |
| 3,712,776 A | * | 1/1973 | Woodham et al. ........... 425/202 |
| 3,732,345 A |   | 5/1973 | Amos et al. |
| 3,932,980 A | * | 1/1976 | Mizutani et al. ........... 53/111 R |
| 4,023,779 A | * | 5/1977 | Beloy ........................... 366/20 |
| 4,175,870 A | * | 11/1979 | Warzel ..................... 366/76.91 |
| 4,260,568 A | * | 4/1981 | Warzel ................... 264/211.22 |
| 4,324,495 A | * | 4/1982 | Martinez ..................... 366/271 |
| 4,848,915 A | * | 7/1989 | Fintel ......................... 366/76.2 |
| 5,110,275 A | * | 5/1992 | Scheuring ................... 425/113 |
| 5,185,117 A |   | 2/1993 | Hawley |
| 5,358,680 A | * | 10/1994 | Boissonnat et al. ....... 264/177.2 |
| 5,401,154 A | * | 3/1995 | Sargent ....................... 425/114 |
| 5,439,623 A | * | 8/1995 | Fintel ......................... 264/40.1 |
| 5,653,534 A | * | 8/1997 | Matsumoto et al. ....... 366/76.1 |
| 6,065,862 A | * | 5/2000 | Althausen et al. ........ 366/162.5 |
| 6,364,518 B1 | * | 4/2002 | Gleich et al. ................. 366/86 |
| 6,419,864 B1 | * | 7/2002 | Scheuring et al. .......... 264/102 |

(Continued)

FOREIGN PATENT DOCUMENTS

DE             14 54 786 A      3/1969

(Continued)

*Primary Examiner*—Charles E. Cooley
(74) *Attorney, Agent, or Firm*—Henry M. Feiereisen

(57) ABSTRACT

A plastics processing machine for producing fiber-containing thermoplastics includes an extruder, and a scale assembly having a weighing plate for determining an amount of fiber to be supplied to the extruder. A fiber feeding device supplies fibers from a take-off unit into the extruder and includes a first fiber guide unit, which is securely fixed to the weighing plate, for removing the fibers from the take-off unit, and a second fiber guide unit which is decoupled from the weighing plate and so constructed as to route the fibers between the first and second guide units in a substantially perpendicular relationship to a gravitational force.

11 Claims, 2 Drawing Sheets

U.S. PATENT DOCUMENTS

| | | | |
|---|---|---|---|
| 6,431,847 B1 * | 8/2002 | Hawley et al. | 425/113 |
| 6,444,153 B1 * | 9/2002 | Shah et al. | 264/211.21 |
| 6,676,864 B1 * | 1/2004 | Hawley | 264/40.1 |
| 6,776,596 B1 * | 8/2004 | Brussel | 425/113 |
| 6,875,385 B1 * | 4/2005 | Hawley et al. | 264/136 |
| 2004/0234639 A1 * | 11/2004 | Sieverding et al. | 425/114 |

FOREIGN PATENT DOCUMENTS

| | | |
|---|---|---|
| DE | 21 00 096 A | 8/1972 |
| DE | 35 41 532 A | 5/1986 |
| DE | 35 41 533 A1 | 5/1986 |
| DE | 299 06 250 U1 | 9/1999 |
| DE | 198 48 124 A1 | 4/2000 |
| EP | 0892254 A1 * | 1/1999 |
| EP | 0893228 A1 * | 1/1999 |
| EP | 1260347 A2 * | 11/2005 |
| FR | 2 777 221 A | 10/1999 |
| JP | 4-125110 * | 4/1992 |
| JP | 10-180806 * | 7/1998 |
| JP | 10-225921 * | 8/1998 |
| JP | 2005-144834 * | 6/2005 |
| JP | 2005-161850 * | 6/2005 |

* cited by examiner

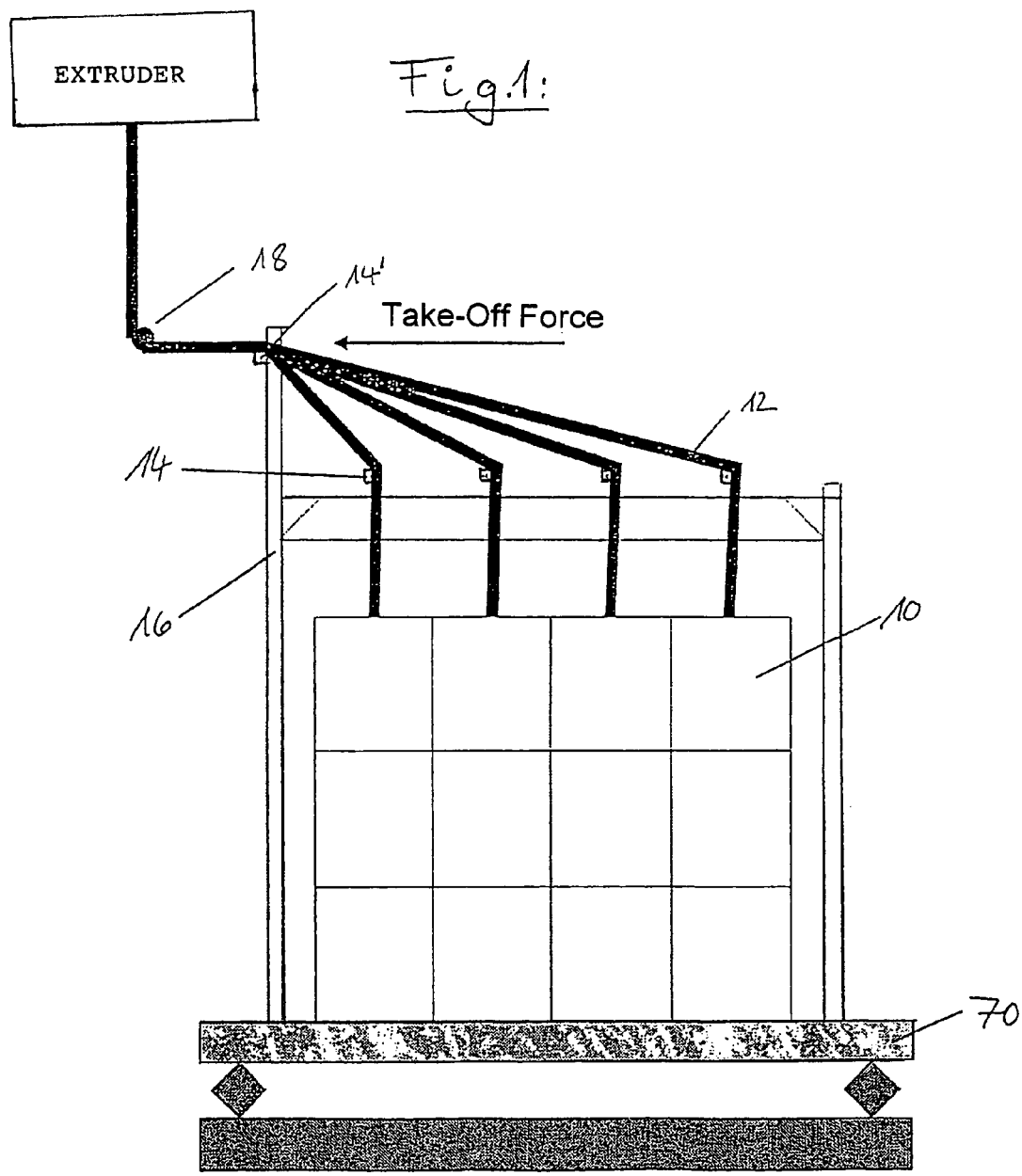

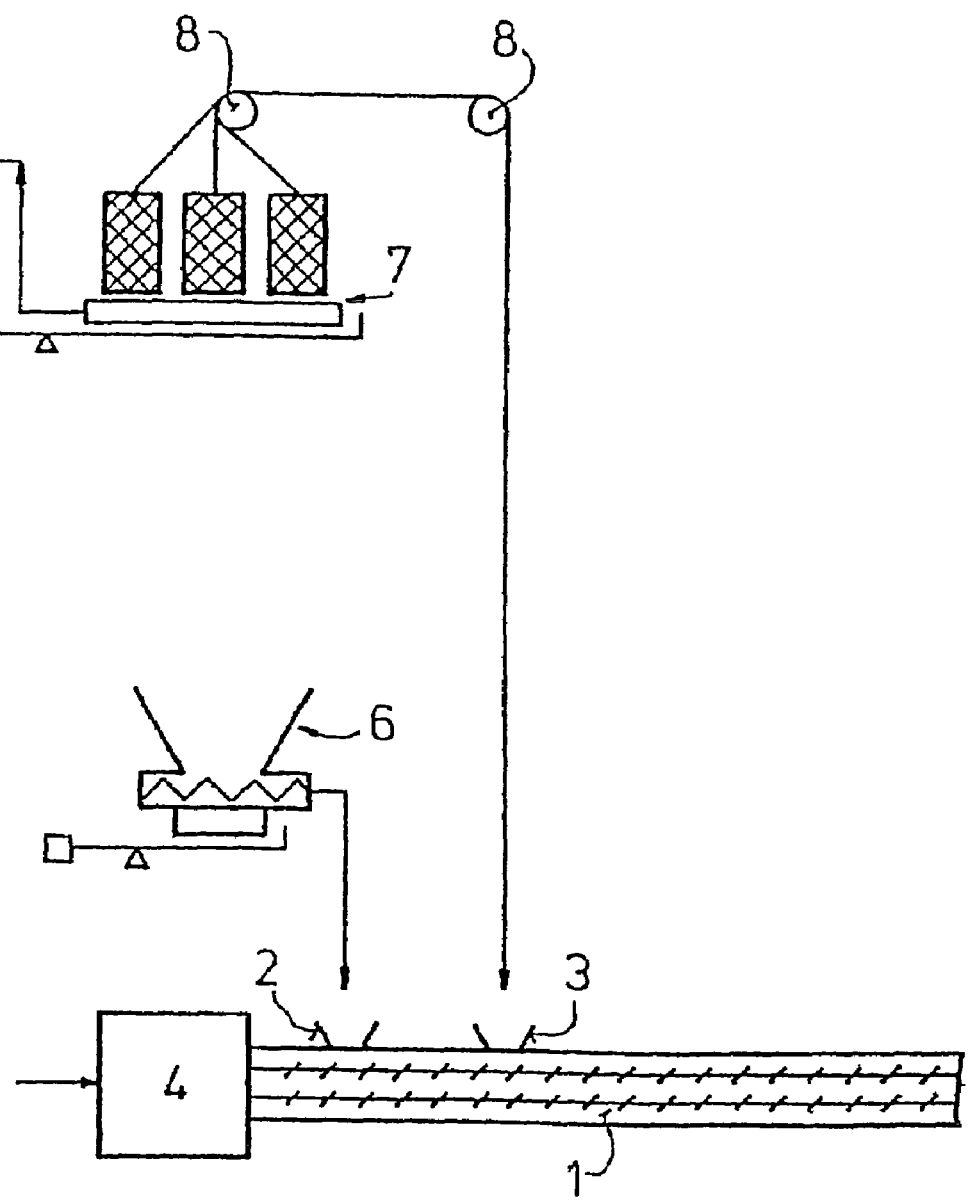

PLASTIC PROCESSING MACHINE FOR PRODUCING FIBER-CONTAINING THERMOPLASTICS

CROSS-REFERENCES TO RELATED APPLICATIONS

This application is a continuation of prior filed copending PCT International application no. PCT/EP02/11861, filed Oct. 23, 2002, which designated the United States and on which priority is claimed under 35 U.S.C. §120, the disclosure of which is hereby incorporated by reference.

This application claims the priority of German Patent Application, Serial No. 101 52 246.0, filed Oct. 23, 2001, pursuant to 35 U.S.C. 119(a)–(d), the disclosure of which is incorporated herein by reference.

BACKGROUND OF THE INVENTION

The present invention relates to a plastics processing machine for producing fiber-containing thermoplastics, and to a scale assembly for use in a plastics processing machine.

In general, mechanical properties of thermoplastics can be enhanced by adding fiber material, in particular glass fibers. The glass fibers are stored on spools, drums or as so-called rovings, and then introduced via an inlet port into the extruder for plasticizing the thermoplastic pellets. Rotation of the extruder screw draws the glass fibers into the extruder interior, which are then comminuted during following screw rotations and evenly spread in the plasticized material. A uniform quality of the produced plastic products can be assured by maintaining a constant quantitative ratio between plastic pellets or plasticized material and fiber fractions in the mixture.

German patent publication no. DE 35 415 32 discloses an apparatus for maintaining a constant weight ratio between thermoplastics and fiber material. Rovings of fiber material are hereby arranged on a weighbridge for measuring the amount of fibers being drawn, and the determined value is then compared with a setpoint value. This comparison of setpoint value with actual value takes place in a control unit which adjusts the respective screw speed of the extruder in response to a deviation between the setpoint value and the actual value. If the actual value falls below the setpoint value, the screw speed is correspondingly increased to thereby draw in more fiber material, whereas the screw speed is correspondingly decreased, when the actual value exceeds the setpoint value. A drawback of this apparatus resides in the significant inaccuracy of the measuring process.

FIG. 2 shows a schematic illustration of the conventional apparatus according to German patent publication no. DE 35 415 32, including an extruder 1 with conventional fiber feeding device. The extruder 1 is constructed as a twin screw extruder which is operated by a motor 4. Pellets of thermoplastic material are introduced by a metering device 6 through a first inlet port 2 into the interior of the extruder 1, whereas fibers are drawn from rovings, disposed on a weighbridge 7, and introduced through a second inlet port 3 into the interior of the extruder 1. A control unit (not shown) controls the screw speed of the extruder screws in dependence on the amount of fiber drawn from the rovings.

As the fiber mass being delivered per time unit is very small in comparison to the mass of the roving(s) placed on the weighbridge, highly sensitive measurements are required. In particular, when the rovings have significant size, substantial take-off forces are necessary to draw the glass fibers. To prevent a kinking or tearing of the fibers during the delivery operation, take-off from the roving should be implemented in a substantial vertical direction. These high vertical take-off forces greatly impact the measuring results of the scale assembly. Tests have shown that the measuring value can fluctuate in a wide range so that the quality of the plastic products is directly adversely affected.

It would therefore be desirable and advantageous to provide an improved plastics processing machine to obviate prior art shortcomings and to include a scale assembly by which the amount of fiber being fed to the extruder is accurately measured to produce plastic products of high quality.

SUMMARY OF THE INVENTION

According to one aspect of the present invention, a plastics processing machine for producing fiber-containing thermoplastics includes an extruder, a scale assembly having a weighing plate for determining an amount of fiber to be supplied to the extruder, and a fiber feeding device for supply of fiber material from a take-off unit to the extruder, wherein the fiber feeding device includes a first fiber guide unit, which is securely fixed to the weighing plate, for removing the fibers from the take-off unit, and a second fiber guide unit which is disengaged from the weighing plate and so constructed as to route the fibers between the first and second guide units in a substantially perpendicular relationship to a gravitational force.

The present invention resolves prior art problems by using a fiber feeding device comprising at least two fiber guide units which are so arranged as to deflect the fibers from the take-off unit, e.g. spool, drum, or roving, in such a direction that the take-off force is prevented from influencing the measurement. This is realized by counterbalancing the force component in parallel relationship to the gravitational force, i.e. the take-off force directed upwards, and the resultant force acting on the deflections. As a consequence, an effective force disengagement in transverse direction takes place so that the take-off force acting perpendicular to the gravitational force is prevented from influencing the measuring result of the scale assembly.

While the first fiber guide unit is securely fixed onto the weighing plate of the scale assembly, the second fiber guide unit is decoupled from the scale assembly and provided for further transport of the fibers for introduction into the extruder. The second fiber guide unit is hereby disposed in relation to the weighing plate such that the fibers are routed between the first and second guide units in a substantially perpendicular relationship to the gravitational force. Thus, only those components of the fiber feeding device that are fixedly connected to the weighing plate are subjected to force components which act parallel to the substantially vertical gravitation force and neutralize one another. As a result, the measurement cannot be distorted.

Currently preferred is a fiber take-off direction from the take-off unit in non-horizontal direction so that the first fiber guide unit has at least one deflecting element by which the fiber take-off direction is so oriented that the effective take-off direction extends substantially perpendicular to the gravitational force when leaving the scale assembly. Suitably, the deflecting element realizes a deflection of the fiber take-off direction by less than 180°, preferably about 90° or less. Suitably, a 90° deflection is realized by using at least two deflecting elements to prevent excessive edge stress of the fibers.

According to another feature of the present invention, the deflecting element may be constructed as a rod oriented in substantial perpendicular relationship to the fiber take-off direction and configured without sharp edges. To minimize wear and tensile stress of the fibers, the use of surface materials with little friction is preferred. Accordingly, the rod may be made of ceramics, or may have a surface made of ceramics.

According to another feature of the present invention, the deflecting element may be constructed as a roller. Suitably, the roller has a rolling surface which is made of ceramics.

According to another aspect of the present invention, a scale assembly for a plastics processing machine includes a weighing plate, and a fiber guide unit, securely fixed to the weighing plate, for removing fibers from a take-off unit. In this way, the afore-described effective transverse force disengagement is enabled.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic illustration of a fiber feeding device for use in a plastics processing machine in accordance with the present invention; and FIG. 2 is a schematic illustration of an extruder with a conventional fiber feeding device.

DETAILED DESCRIPTION OF PREFERRED EMBODIMENTS

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a fiber feeding device for use in a plastics processing machine in accordance with the present invention. For sake of simplicity and clarity, only those parts of the plastics processing machine are shown here which are necessary for the understanding of the present invention. In other words, only the fiber feeding device is shown here by way of its components relating to the weighing device.

The fiber feeding device is provided to supply glass fibers from a take-off unit 10, such as spools, drums, rovings or the like. The plastics processing machine has a scale assembly of which only a weighing plate 70 is shown. Securely mounted on the weighing plate 70 is a first fiber guide unit having a frame 16 and deflecting elements 14 which are attached to the frame 16. In the non-limiting example of FIG. 1, each fiber strand 12 is routed by its own deflecting element 14, and the fibers 12 are then routed about a common deflecting element 14' which forms another part of the first fiber guide unit and is also mounted to the frame 16. In this way, the flow of the bundled fiber strands 12 can be decoupled from the scale assembly.

Disposed outside the scale assembly is at least one second fiber guide unit 18 for further transport of the fiber strands 12 to an extruder (shown in FIG. 2 but not shown in FIG. 1). The take-off unit 10 is arranged on the weighing plate 70, with the fibers 12 being drawn from the take-off unit 10 in substantially vertical direction in opposition to the direction of the gravitational force. To prevent the force component in opposition to the gravitational force from influencing the measurement by the scale assembly, the take-off direction of the fibers is so deflected by the deflecting elements 14, 14' that the fiber take-off direction is oriented substantially perpendicular to the gravitational force, when the fiber strands 12 leave the arrangement of weighing plate 70 and first fiber guide unit. Outside this arrangement of weighing plate 70 and first fiber guide unit, the fiber strands 12 are fed to the second fiber guide unit 18 which is decoupled from the weighing plate 70 so that the fibers 12 run substantially horizontal between the first fiber guide unit and the second fiber guide unit 18.

As the force components in parallel relationship to the gravitation force within the arrangement of weighing plate 70 and first fiber guide unit compensate one another, an effective transverse force decoupling is realized during fiber take-off. As a consequence, the measurement of the scale assembly is very precise and reliable.

In response to the acquired measuring results, a control unit (not shown) is able to control the supply of thermoplastics into the extruder and/or the screw speed of the extruder. In view of the simple decoupling of vertical and horizontal force components during fiber take-off, the measurement becomes very precise and assures a high quality of the process to produce plastic products with constant ratio of thermoplastics and fibers.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A plastics processing machine for producing fiber-containing thermoplastics, comprising:
    an extruder;
    a scale assembly having a weighing plate for determining an amount of fiber to be supplied to the extruder; and
    a fiber feeding device for supply of fiber material from a take-off unit to the extruder, said fiber feeding device including a first fiber guide unit, which is securely fixed to the weighing plate, for removing the fibers from the take-off unit, and a second fiber guide unit which is decoupled from the weighing plate and so constructed as to route the fibers between the first and second guide units in a substantially perpendicular relationship to a gravitational force.

2. The plastics processing machine of claim 1, wherein the first fiber guide unit includes at least one deflecting element for deflecting a fiber take-off direction by less than 180°.

3. The plastics processing machine of claim 2, wherein the deflecting element is constructed as a rod oriented in substantial perpendicular relationship to the fiber take-off direction.

4. The plastics processing machine of claim 3, wherein the rod is made of ceramics.

5. The plastics processing machine of claim 3, wherein the rod has a surface made of ceramics.

6. The plastics processing machine of claim 2, wherein the deflecting element is constructed as a roller.

7. The plastics processing machine of claim 6, wherein the roller has a rolling surface made of ceramics.

8. The plastics processing machine of claim 1, wherein the first fiber guide unit includes at least two deflecting elements for deflecting a fiber take-off direction by about 90° or less.

9. The plastics processing machine of claim 1, wherein the take-off unit is a member selected from the group consisting of spool, drum and roving.

10. In combination:
   a scale assembly; and
   a fiber feeding device for transporting fiber material from the scale assembly to an extruder, said fiber feeding device comprising:
   a first fiber guide unit securely fixed to the scale assembly and drawing fibers in a substantially vertical direction in opposition to a gravitational force, and
   a second fiber guide unit which is decoupled from the scale assembly and constructed such that the fibers travel between the first and second guide units in a substantially perpendicular relationship to the gravitational force.

11. The combination of claim 10, wherein the first fiber guide unit includes a frame mounted to the scale assembly, and a deflection assembly mounted to the frame for deflecting a travel of the fiber by less than 180°.

* * * * *

UNITED STATES PATENT AND TRADEMARK OFFICE
CERTIFICATE OF CORRECTION

PATENT NO. : 7,048,431 B2  
APPLICATION NO. : 10/828830  
DATED : May 23, 2006  
INVENTOR(S) : Matthias Sieverding et al.

It is certified that error appears in the above-identified patent and that said Letters Patent is hereby corrected as shown below:

<u>Title Page (75), line 1</u>: change "München" to --Altomünster--

<u>Title page (73)</u>: change "Krauss-Maffei Kunststoffechnik" to

--Krauss-Maffei Kunststofftechnik--

Signed and Sealed this

Fourteenth Day of November, 2006

JON W. DUDAS  
*Director of the United States Patent and Trademark Office*